United States Patent [19]

Otsuki et al.

[11] Patent Number: 4,708,464
[45] Date of Patent: Nov. 24, 1987

[54] DEVICE FOR ERASING UNNECESSARY IMAGES FOR USE IN READER-PRINTERS

[75] Inventors: Hajime Otsuki, Yokohama; Kenjiro Ishii, Sagamihara; Yutaka Satoh, Yokohama; Fumio Fukumoto, Sagamihara, all of Japan

[73] Assignee: Minolta Camera Kabushiki Kaisha, Osaka, Japan

[21] Appl. No.: 928,712

[22] Filed: Nov. 7, 1986

Related U.S. Application Data

[63] Continuation of Ser. No. 823,527, Jan. 29, 1986, abandoned.

[30] Foreign Application Priority Data

Jan. 30, 1985 [JP] Japan ................................. 60-17247

[51] Int. Cl.$^4$ .......................................... G03B 13/28
[52] U.S. Cl. ......................................... 355/45; 355/7; 355/71; 355/74
[58] Field of Search .......................... 355/7, 45, 71, 74

[56] References Cited

U.S. PATENT DOCUMENTS

| | | | |
|---|---|---|---|
| 3,627,411 | 12/1971 | Nagel | 355/45 |
| 3,724,940 | 4/1973 | Koizumi | 355/7 X |
| 3,792,913 | 2/1974 | Simmons | 355/7 |
| 3,807,855 | 4/1974 | Zajac | 355/29 |
| 3,827,799 | 8/1974 | Koizumi | 355/7 X |
| 3,967,896 | 7/1976 | Looney et al. | 355/7 X |
| 4,023,896 | 5/1977 | Koch | 355/7 X |
| 4,133,609 | 1/1979 | Arai | 355/7 X |
| 4,215,929 | 8/1980 | Sato et al. | 355/7 |
| 4,256,400 | 3/1981 | Komori et al. | 355/7 X |

FOREIGN PATENT DOCUMENTS 56-110924 2/1981 Japan.
56-143467 9/1981 Japan.

Primary Examiner—Richard A. Wintercorn
Attorney, Agent, or Firm—Burns, Doane, Swecker & Mathis

[57] ABSTRACT

Disclosed is a reader-printer being capable of erasing a frame surrounding margin of a microfilm and unnecessary image portion in the frame. The reader-printer comprises first flap member, second flap member which are disposed adjacent to a slit and movable in and out of a light path directing toward a photosensitive drum and a lamp to illuminate those flap members when they are moved into the light path. The first flap member is movable in the longitudinal direction along the slit for varying a shading area.

10 Claims, 13 Drawing Figures

DEVICE FOR ERASING UNNECESSARY IMAGES FOR USE IN READER-PRINTERS

This application is a continuation of Ser. No. 823,527, filed Jan. 29, 1986, now abandoned.

BACKGROUND OF THE INVENTION

The present invention relates to a device for erasing unnecessary images for reader-printers adapted to project microfilm images on a screen upon enlargement and to copy such images. The reader-printer to which the present invention is applicable has a printer unit of the type designed to project a microfilm image on a photosensitive member in the form of a slit, develop the resulting charge image and transfer the developed image onto paper. The printer unit produces positive copies from either negative films or positive films.

The negative film has a transparent character area of characters, illustrations or the like, an opaque background area and a transparent margin surrounding these areas. Conversely, the positive film is opaque over the character area and the surrounding marginal area and transparent over the background area.

The arrangement for producing positive copies from negative and positive films includes, for example, a charger changeable to positive or negative polarity, a photosensitive member chargeable to positive or negative polarity, and a developing unit adapted for normal development or reversal development selectively by changing the developing bias. When this arrangement is used for negative films, the light passing through the transparent area of the film is projected on the photosensitive member, and toner is deposited on the portion of the member exposed to the light. In the case of positive films, on the other hand, the portion of the photosensitive member left unexposed to light is developed. Reader-Printer RP505 manufactured by Minolta Camera Kabushiki Kaisha comprises such an arrangement.

When a positive copy is to be obtained from a negative film (hereinafter referred to as "N→P case"), as well as when a positive copy is to be prepared from a positive film (hereinafter referred to as "P→P case"), the surrounding margin will be developed if printed as it is. However, the developed margin is unnecessary for the user, and the absence of the margin is rather preferable.

On the other hand, it may be desired to copy a specific area only of the image on a film. For example, there arises a need to copy a specific portion only of the customers list used in banks, etc. and recorded in COM (computer output microfiche) in which data as to a large number of customers is listed up in each frame. When conventional reader-printers are used in such a case, the image within the entire frame is copied, so that it is practice to cut off the necessary portion only from the copy and affix the copy portion to paper of suitable size.

SUMMARY OF THE INVENTION

Accordingly, the main object of the present invention is to provide a device for erasing the surrounding margin or an unnecessary image portion of the frame for use in reader-printers which are adapted to produce positive copies from either negative films or positive films.

Another object of the present invention is to provide a device capable of erasing an unnecessary image portion when copying a film irrespective of whether it is negative or positive.

These and other objects can be fulfilled by a reader-printer for projecting an image on a microfilm on a screen and producing a positive copy by projecting the image on a photosensitive member irrespective of whether the film is negative or positive, the reader-printer being characterized by:

a lens for projecting the microfilm image, first mirror means for guiding the entire image to the screen, second mirror means for guiding the image through a slit to the photosensitive member by a scanning movement, first flap means disposed in the vicinity of at least one longitudinal end of the slit and movable into or out of the optical path of the second mirror means for partially blocking the image when positioned in the optical path, the first flap means being variable in the area of blocking region when positioned in the optical path and having a reflecting surface on one side thereof opposed to the photosensitive member, second flap means movable into or out of the optical path of the second mirror means for blocking the image in its entirety in cooperation with the first flap means when positioned in the optical path, the second flap means having a reflecting surface on one side thereof opposed to the photosensitive member, illuminating means for projecting light onto the first and second flap means, means for specifying the area of the blocking region provided by the first flap means, means for identifying the film as to whether it is negative or positive, and means for controlling the movement of the first and second flap means and the operation of the illuminating means according to the region specifying means and the film identifying means.

BRIEF DESCRIPTION OF THE DRAWINGS

These and other objects or features of the present invention will become apparent from the following description of a preferred embodiment thereof taken in conjunction with the accompanying drawings, in which.

In the following description, like parts are designated by like reference numbers throughout the several drawings.

DESCRIPTION OF THE PREFERRED EMBODIMENT

Figure 1:
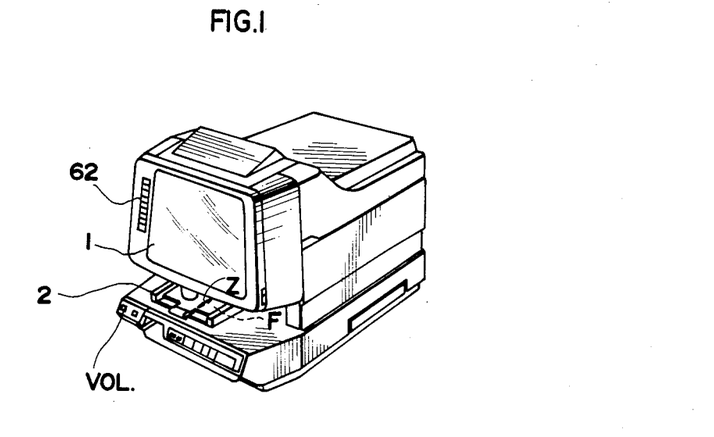
FIG. 1 is a perspective view of a reader-printer to which the present invention is applied.
Figure 2:
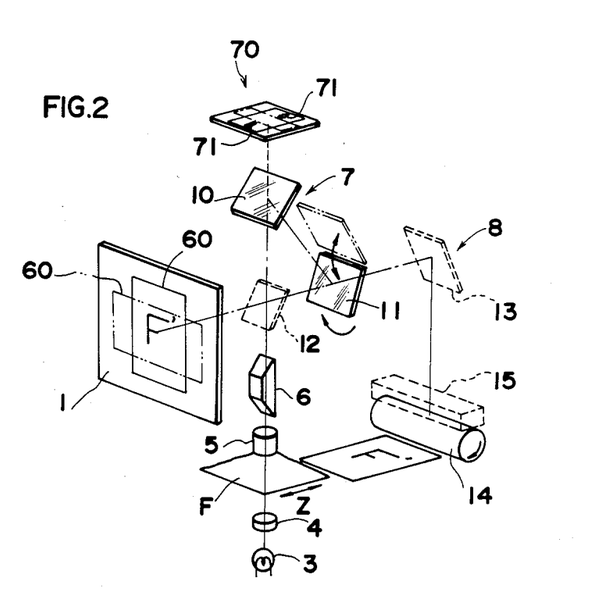
FIG. 2 is a schematic perspective view showing the optical system of the reader-printer.

FIG. 1 shows the appearance of a reader-printer to which the present invention is applied, and FIG. 2 schematically shows the optical system thereof. With reference to these drawings, a screen 1 is provided on the front side of the reader-printer. A carrier 2 for holding a microfilm F is provided at a lower portion of the front side. Referring to FIG. 2, the film F is illuminated by a lamp 3 through a condenser lens 4, and an optical image of the film is projected by a projection lens 5. The optical image from the projection lens 5 passes through an image rotation prism 6 and is guided to mirror systems providing a reader optical path and a printer optical path. The image rotation prism 6 is a Dove prism, which, when rotated about the optical axis, rotates the projected image through an angle equal to twice the angle of rotation.

A reader mirror system 7 providing the reader optical path comprises a fixed mirror 10 disposed above the projection lens 5, and a pivotable mirror 11 for reflecting the image from the fixed mirror 10 toward the screen 1. When the reader-printer is in print mode, the pivotable mirror 11 is held retracted in the position shown in two-dot-dash lines in FIG. 2. The printer optical path is provided by a printer mirror system 8 which comprises a pair of mirrors 12, 13 translatable together and having their reflecting surfaces opposed to and inclined toward each other, and unillustrated mirror drive means. The image of the microfilm is projected onto a photosensitive drum 14 in the form of a slit by the horizontal movement of the pair of mirrors at a given speed.

Figure 3:
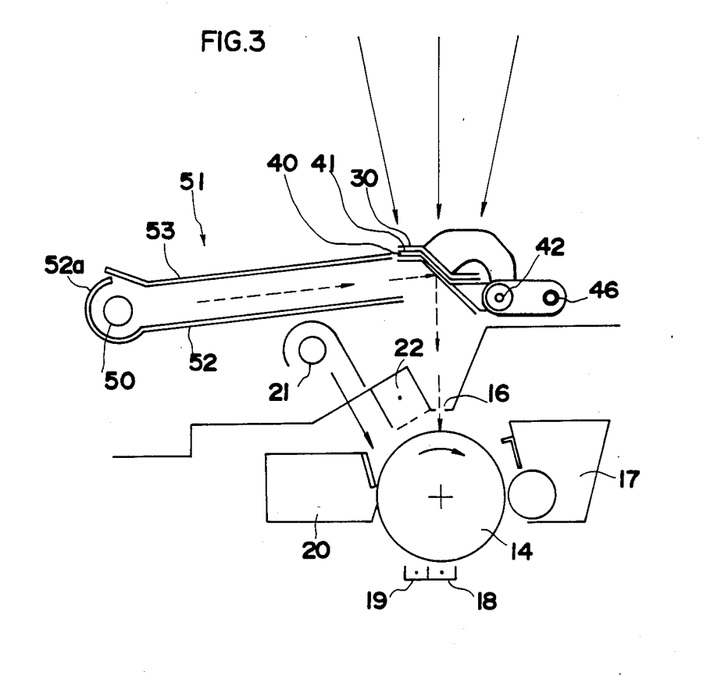
FIGS. 3 and 4 are a sectional view and a perspective view, respectively, schematically showing an unnecessary image erasing device embodying the invention.
Figure 4:
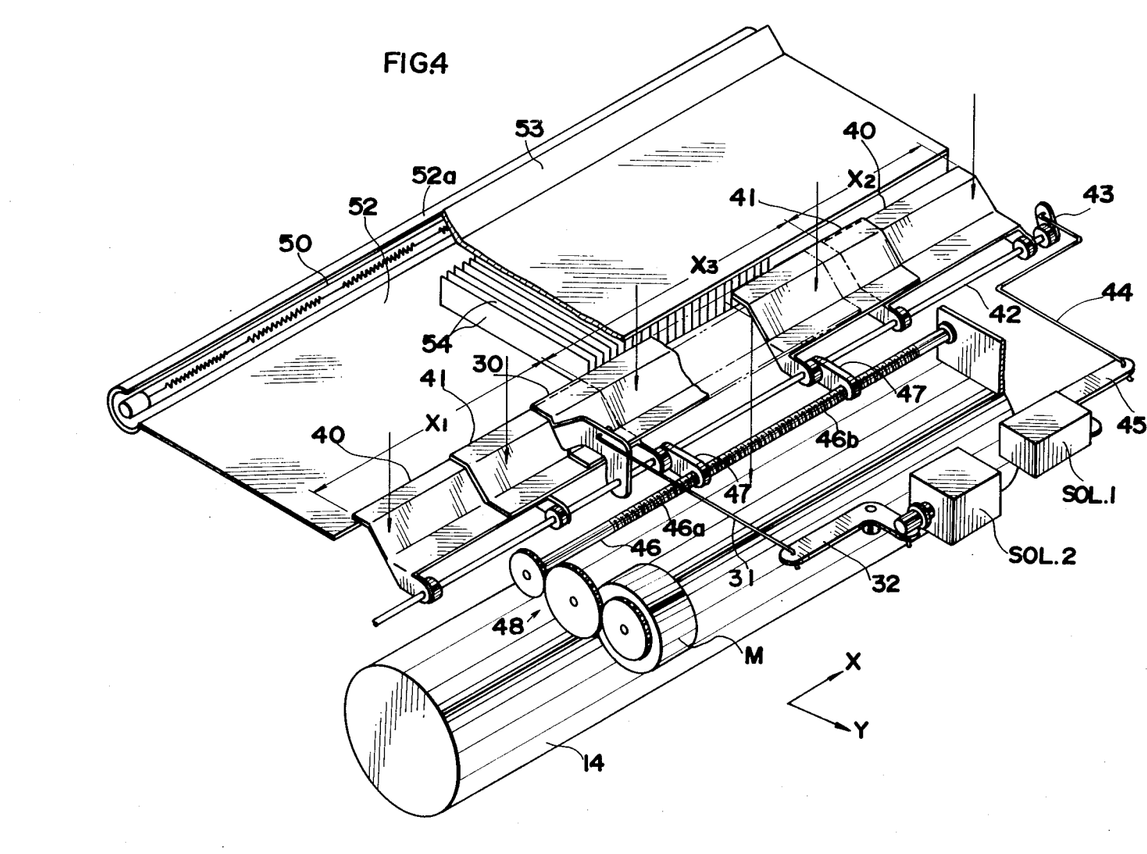

An unnecessary image erasing device 15 embodying the present invention is provided in the printer optical path before the drum 14. FIG. 3 is a schematic view in section showing the erasing device 15 and devices arranged around the drum 14 and including a slit 16, developing unit 17, transfer and separating chargers 18, 19, cleaner 20, eraser lamp 21 and charger 22. FIG. 4 is a perspective view showing the erasing device 15.

The erasing device of the present invention operates for films irrespective of whether they are negative or positive. By this device, unnecessary images are erased from the surrounding margin of the film (which corresponds to the front and rear portions, with respect to the direction of advance of paper, of the image formed on the drum, in the case of the present embodiment) and also from the image area other than the partial copying area specified by the user.

The mode of erasing images differs depending on whether the film is negative or positive. In the case of the negative film in which the portion of the photosensitive drum exposed to light is developed, the optical path from the projection lens is blocked at the portion thereof corresponding to an unnecessary image for erasing the image. In the case of the positive film, on the other hand, the portion of optical path from the projection lens corresponding to the unnecessary image is blocked, and the portion of the drum corresponding to the blocked path portion is irradiated with another light for erasing.

With reference to FIGS. 3 and 4, the unnecessary image erasing device 15 of the present invention generally comprises an assembly for blocking the image light directed toward the photosensitive drum, and an assembly for projecting another light onto the photosensitive drum.

The light blocking assembly includes a pair of flap mechanisms acting for partial copying, arranged at the longitudinal opposite ends of the slit 16 and having a variable light blocking width longitudinally of the slit, and a flap member 30 for a blank portion which member has a sufficient size to cover the region between the pair of flap mechanisms.

Each of the flap mechanisms comprises an outer flap member 40 fixedly positioned longitudinally along the slit, and an inner flap member 41 overlapping the outer flap member 40 and movable longitudinally along the slit. These outer and inner flap members 40, 41 are supported by a rod 42 extending longitudinally of the slit. The outer flap member 40 is fixedly mounted on the rod 42 against movement in the longitudinal direction of the rod and about the rod axis, while the inner flap member 41 is fixed only with respect to the direction around the rod but is free to move longitudinally thereon. The rod 42 is rotatably supported by unillustrated bearings and connected to a solenoid SOL.1 by an arm 43 attached to one rod end, a link 44 and bell crank 45. The solenoid SOL. 1, when energized, rotates the rod 42 to retract the outer and inner flap members 40, 41 from the optical path.

To move the inner flap members 41 longitudinally along the slit 16, a screw rod 46 is provided in parallel with the rod 42. The screw rod 46 has a left-handed screw portion 46a and a right-handed screw portion 46b. An arm 47 is screwed on each screw portion. The screw rod 46 is coupled to a motor M by a train of gears 48. The forward or reverse rotation of the motor M moves the two arms 47 toward or away from each other. The inner flap members 41, which are connected to the arms 47, follow this movement of the arms 47. The above arrangement varies the light blocking widths X1 and X2 of the pair of flap mechanisms (FIG. 4). The light blocking widths are thus varied by adjusting a volume member VOL on the panel shown in FIG. 1. The image light passing area X3 is displayed by an indicator 62 provided at one side of the screen 1 and comprising a plurality of LEDs.

The remaining blank flap member 30 constituting the light blocking assembly is idly supported by the rod 42 and rests at its opposite ends on the inner flap members 41. The blank flap member 30 retracts from the optical path along with the outer and inner flap members when these flap members retract from the optical path. When the outer and inner flap members are positioned in the optical path, the blank flap member 30 is independently movable into or out of the optical path by a solenoid SOL.2 connected to the member 30 by a link 31 and a bell crank 32.

Each of the flap members has a reflecting surface on one side thereof opposed to the photosensitive drum 14. The illuminating assembly is disposed beside the light blocking assembly for projecting light onto the drum by the reflecting surfaces. The illuminating assembly comprises a lamp 50 extending in parallel with the slit longitudinally of the slit and approximately equal to the slit in length, and a light guide 51 for guiding the light from the lamp 50 to the flap members. The light guide 51 comprises a lower guide member 52 including a portion 52a surrounding the lamp 50, an upper guide member 53, and a plurality of louvers 54 arranged between the two guide members at a portion corresponding to the partial copying area for directing the light from the lamp 50 toward the reflecting surfaces of the flap members. The plurality of louvers 54 make the light from the lamp 50 parallel rays to clarify the boundary between a copying area and a non-copying area in P→P partial copying case.

Figure 5:
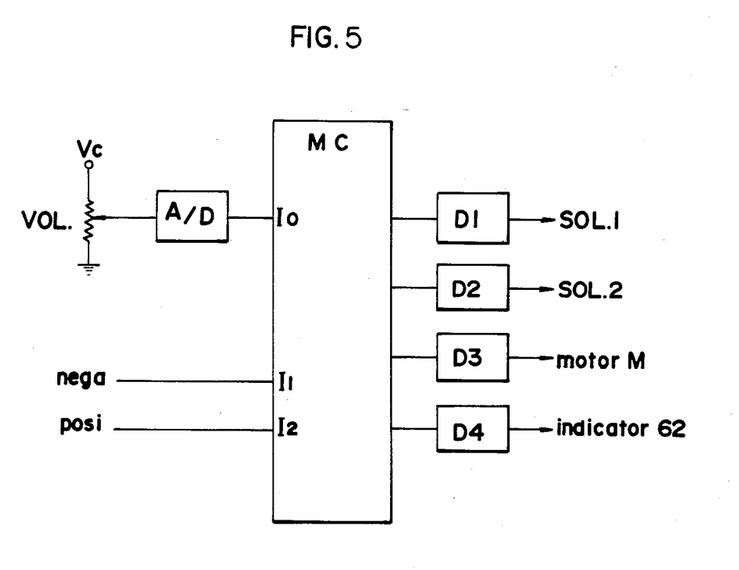
FIG. 5 is a diagram showing a control system for the erasing device of the invention.

With reference to FIG. 5, a control system for the present device will be described. The device is controlled by a known microcomputer MC. The analog voltage from the volume member VOL on the panel is converted into digital data by an A/D converter which is then fed to the microcomputer MC. Nega signal or Posi signal identifying the film as to whether it is negative or positive is also fed to the computer. These signals are processed within the microcomputer MC, which delivers signals via drivers D1 to D4 to the solenoids SOL.1, SOL.2, the motor M and the indicator 62 for controlling the device as will be described later.

Figure 6:
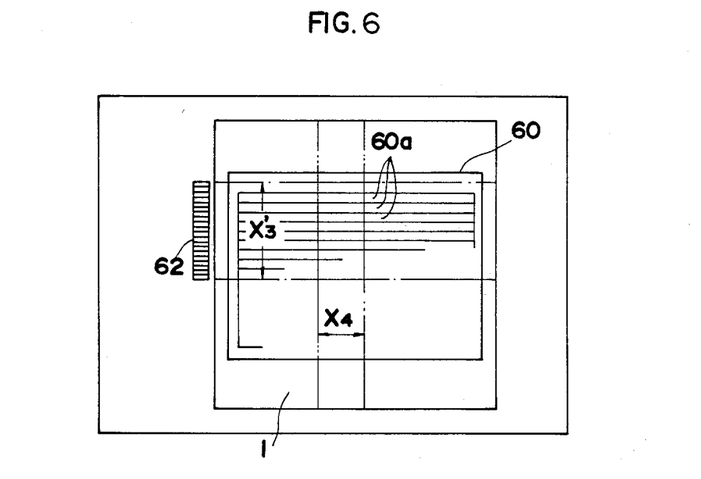
FIG. 6 is a front view of a screen portion.

The reader-printer of the present invention is compatible with COMs (computer output microfiches). As seen in FIG. 6, the COM includes frame, each of which is in the form of a horizontally elongated image 60 in which a multiplicity of horizontal record spaces 60a are arranged one above another. To compact the apparatus, copy paper is fed in a vertical position (with its long side in parallel with the feed direction) as shown in FIG. 2. Accordingly, the reader-printer of the present embodiment includes the image rotation prism 6 so that the frame is projected in a horizontal position in reader mode or in a vertical position in printer mode. The orientation of the image is detected by detecting means 70 shown in FIG. 2. The detecting means 70 is disposed above the reader fixed mirror 10 which is a semitransparent mirror. The means 70 has a plurality of photodetectors at each of portions corresponding to the upper and lower ends of the screen 1. The state of light impinging on these photodetectors indicates the orientation of the image. When the mode is changed to printer mode, the output of the detecting means automatically rotates the prism 6 to orient the image vertically.

To set a partial copying area in conformity with the form of the COM, the number of horizontal record spaces are selectable. For this purpose, the indicator 62 for showing the set partial copying area is provided at one side of the screen 1. It is to be noted that the unnecessary image to be erased is positioned above or below the partial copying area x'3 on the screen 1 but is at the left or right side of the transport direction of the copy paper.

When the width x'3 of the partial copying area is set by manipulating the volume member VOL with reference to the indicator 62, the carrier 2 is moved in a Z direction in FIG. 1 to make the record spaces on the COM to be copied coincide with the area to be printed.

Figure 7:
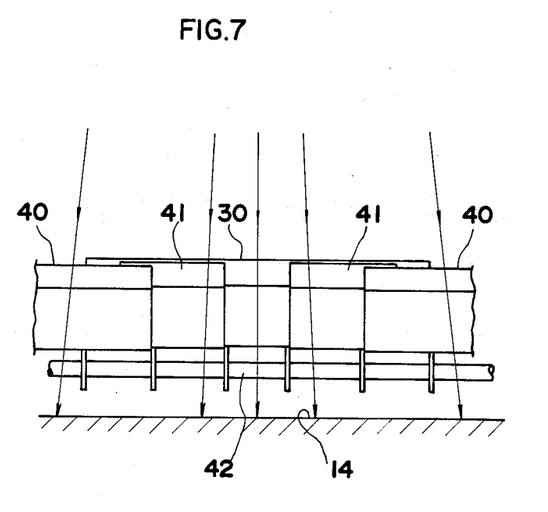
FIGS. 7 to 12 are diagrams for illustrating the operation of the erasing device.
Figure 8:
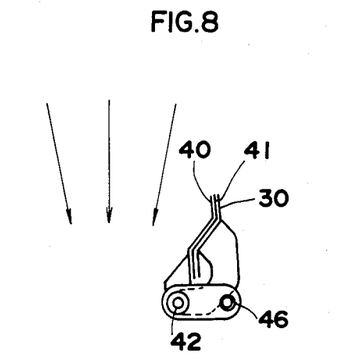
Figure 9:
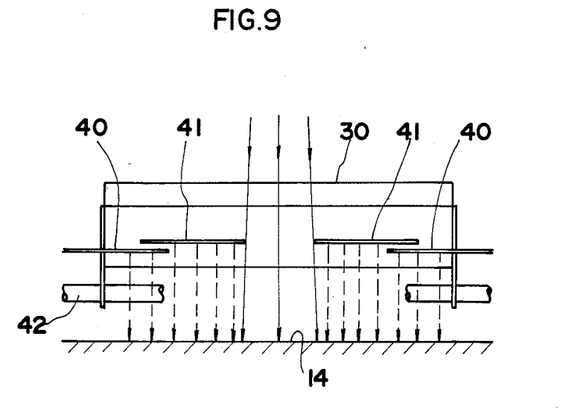

Next, the operation of the unnecessary image erasing device will be described with reference to FIGS. 7 to 12. FIGS. 7, 9 and 11 show the device as it is seen in the direction Y shown in FIG. 4, while in FIGS. 8, 10 and 12, the device is viewed in the direction X in FIG. 4. FIGS. 7 and 8 show the state of the erasing device when no part of the image is to be erased, FIGS. 9 and 10 show the device in condition for partial copying in P→P case, and FIGS. 11 and 12 show the device in condition for partial copying in N→P case.

With reference to FIGS. 7 and 8, when no image is to be erased, all the flap members are held retracted from the optical path, permitting the entire image light from the projection lens to impinge on the photosensitive drum.

Figure 10:
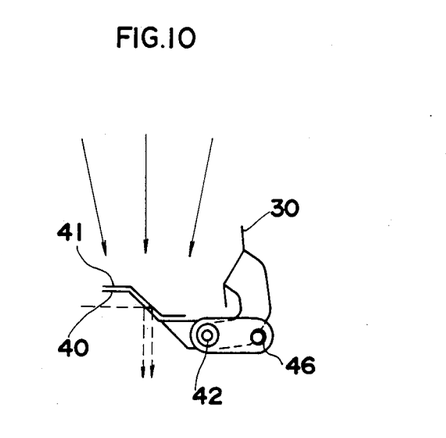
Figure 11:
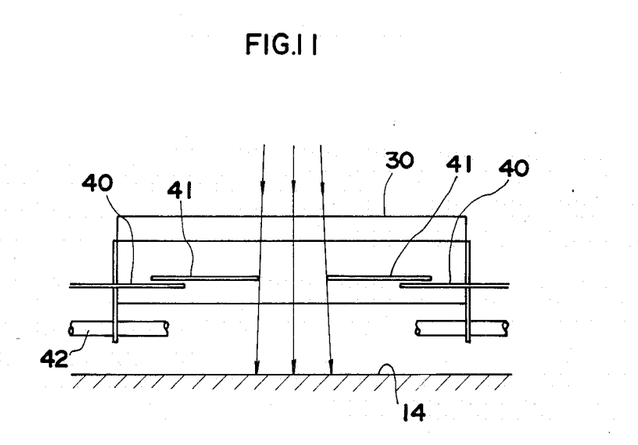

For partial copying in P→P case, the pairs of outer and inner flap members 40, 41 are advanced into the optical path by the energization of the solenoid SOL.1, while the blank flap member 30 is positioned outside the optical path as seen in FIGS. 9 and 10. At this time, the lamp 50 is turned on, and the light of the lamp is reflected from the reflecting surfaces of the members 40, 41 to reach the drum 14 and thus erase an unnecessary image. The pair of inner flap members 41 has been moved longitudinally along the slit by the rotation of the motor M and and positioned to define the set width. The microfilm image passes only through the region between the inner flap members 41 and reaches the drum 14. Consequently an image of microfilm is formed on the portion of the drum corresponding to the partial copying area, and the charges on the area from which the unnecessary image is to be erased disappear.

Figure 12:
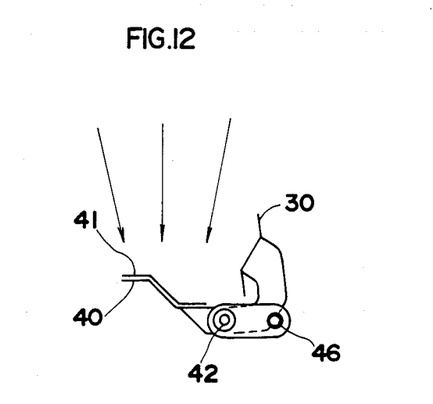

With reference to FIGS. 11 and 12, when partial copying is to be performed in N→P case, the flap members are in the same position as in P→P case, whereas the lamp 50 is off. Accordingly, no light is projected on the image erasing area on the drum, permitting the charges given by the charger 22 to remain on this area. However, no toner is deposited on this area by reversal development.

Next, erasing of image from blank portions will be described. The present embodiment is so designed that the width of the film image to be projected matches the width of paper, so that of the four sides of the film, the blank portions to be acted on for erasing are the front and rear portions, with respect to the scan direction, of the projection image. For the erasing of these blank portions, all the flap members are positioned in the optical path, and the lamp 50 is turned on in P→P case or is turned off in N→P case. When copying operation is conducted in this state, the undesired image is erased from the blank portions.

Although the partial copying area is set with respect to only one direction according to the foregoing description, the area can be set also in a direction perpendicular to the above direction using the blank flap member 30. With reference to FIG. 6, copying operation for the area having a width X'3 and a width X4 will be described. The scan direction is horizontal on the screen 1 of FIG. 6. For erasing image from the area other than the width x'3, the pairs of outer and inner flap members 40, 41 are positioned as illustrated in FIGS. 9 and 10 or in FIGS. 11 and 12. The blank flap member 30 is positioned in the optical path before scanning exposure, then retracted from the path when the area of width x4 is scanned, and positioned in the optical path again on completion of the scanning over the width x4. When the blank flap member 30 is thus controlled, the unnecessary image can be erased from the portion other than the width x4 with respect to the scan direction. The width x4 can be set by the same means as used for setting the width x'3.

Figure 13:
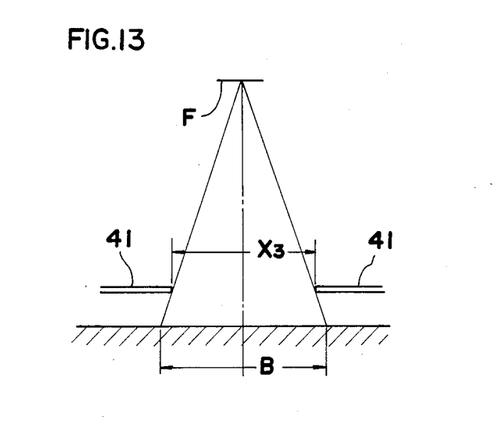
FIG. 13 is a diagram for illustrating the amount of movement of inner flap members.

The amount the inner flap members 41 are to be moved will be described with reference to FIG. 13. Since the projection lens 5 of the reader-printer has a large field angle, the rays incident on the drum 14 at the ends of the projected image are inclined. Accordingly, when partial copying is to be performed over a width B on the drum, the distance between the inner flap members 41 must be set to a width X3 which is slightly smaller than the width B. The difference between these widths is determined by the spacing between the drum and the inner flap members and the field angle of the lens covering the partial copying area. The motor M for the inner flap members 41 controls the width x3 between the inner flap members so that the width B on the drum matches the width specified by use of the indicator 62.

Although the present invention has been fully described by way of example with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A device for erasing unnecessary images for use in reader-printers in which an image of a microfilm is selectively projected to a screen entirely or to a photosensitive medium through a slit stepwisely and the image projected to the photosensitive medium is formed into a positive copy irrespective of negative or positive film, said device comprising;
    first flap means disposed in the vicinity of at least one longitudinal end of the slit and movable into or out of an optical path for the image directed to the photosensitive medium for partially blocking the image when positioned in the optical path, said first flap means forming a block region which has a variable area when positioned in the optical path and having a reflecting surface on one side thereof opposed to the photosensitive medium,
    second flap means disposed in the vicinity of the slit and movable into or out of the optical path for blocking the image in its entirety in cooperation with said first flap means when positioned in the optical path, said second flap means having a reflecting surface on one side thereof opposed to the photosensitive medium,
    illuminating means for projecting light onto the first and second flap means, and
    means for controlling the movement of said first and second flap means and the operation of said illuminating means.

2. A device as claimed in claim 1, wherein said control means controls said illuminating means so as to turn off said illuminating means when negative film is used and to turn on said illuminating means when positive film is used.

3. A device as claimed in claim 1, further comprising means for specifying the area of the blocking region by said first flap means, wherein said control means controls said first flap means so as to vary the blocking region in accordance with the area of the blocking region specified by said specifying means.

4. A device as claimed in claim 1, wherein said first flap means includes a fixed flap and a movable flap which are arranged along the longitudinal direction of the slit and are partially overlapping each other.

5. A reader-printer in which an image of a microfilm is selectively projected to a screen entirely or to a photosensitive medium through a slit stepwisely and the image projected to the photosensitive medium is formed into a positive copy irrespective of negative or positive film, said reader-printer comprising:
    a lens means for projecting the microfilm image,
    first mirror means for guiding the entire image from said lens means to the screen,
    second mirror means for guiding the image from said lens means to the photosensitive medium through the slit by a scanning movement,
    first flap means disposed in the vicinity of at least one longitudinal end of the slit and movable into or out of an optical path of said second mirror means for partially blocking the image when positioned in the optical path, said first flap means forming a blocking region which has variable area when positioned in the optical path and having a reflecting surface on one side thereof opposed to the photosensitive medium,
    illuminating means for projecting light onto the first and second flap means,
    means for specifying the area of the blocking region provided by said first flap means,
    means for identifying the film as to whether said film is negative or positive, and
    means for controlling the movement of the first and second flap means and the operation of the illuminating means in accordance with said area specifying means and film identifying means for erasing the unnecessary image of the microfilm from the copy.

6. A reader-printer as claimed in claim 5, wherein said control means controls said illuminating means so as to turn off when negative film is used and to turn on when positive film is used.

7. A reader-printer as claimed in claim 5, wherein said control means controls said first flap means so as to vary the area of the blocking region in accordance with the specified area of the blocking region.

8. A reader-printer as claimed in claim 5, wherein said first flap means includes a fixed flap and a movable flap which are arranged along the longitudinal direction of the slit and are partially overlapping each other.

9. A reader-printer as claimed in claim 5, wherein said area specifying means includes an input member for inputting a signal for specifying the area of the blocking region and an indicator for indicating an expected partial copying area.

10. A reader-printer as claimed in claim 9, wherein said indicator is disposed adjacent to the screen.

* * * * *